No. 807,996. PATENTED DEC. 19, 1905.
H. G. BEEDE.
AUTOMATIC INTERMITTENT DRIVING MECHANISM.
APPLICATION FILED NOV. 14, 1904.
3 SHEETS—SHEET 1.
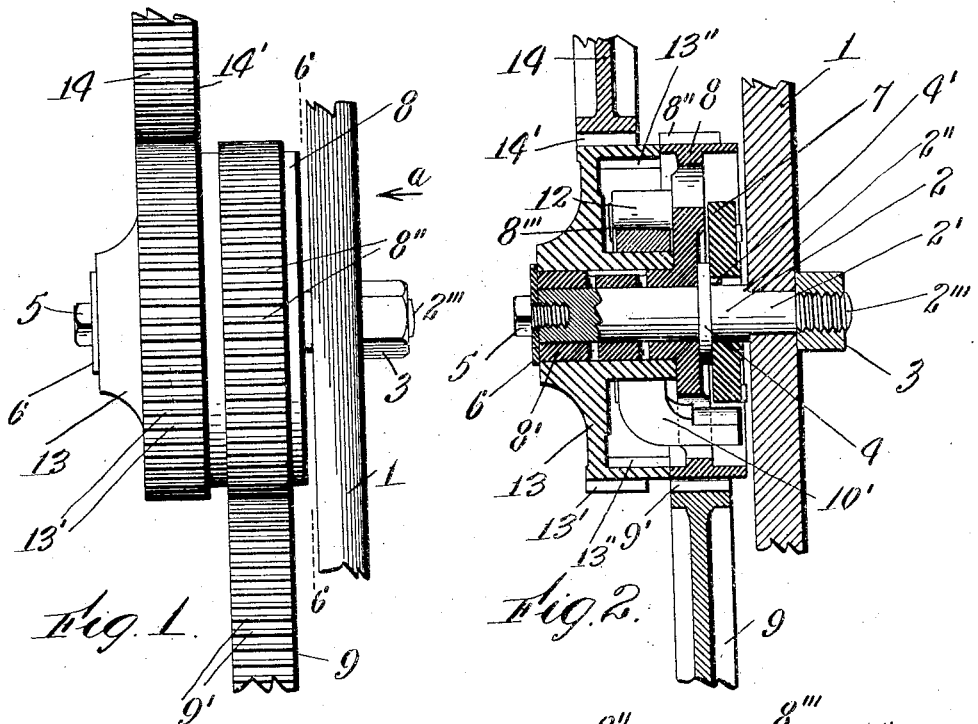
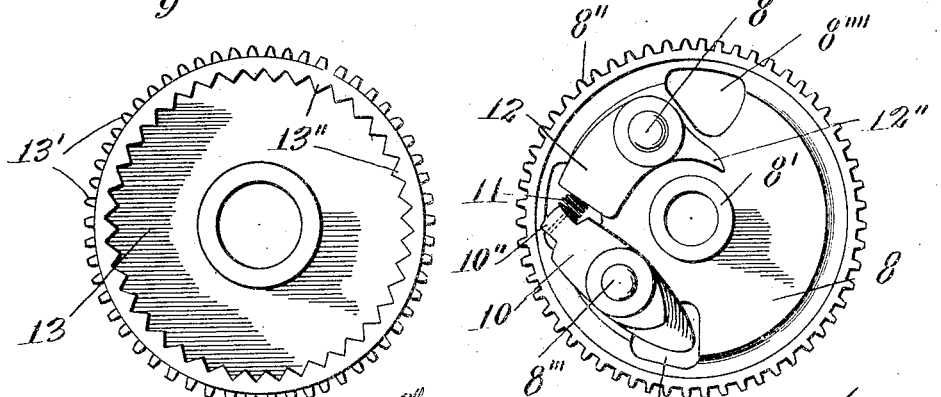
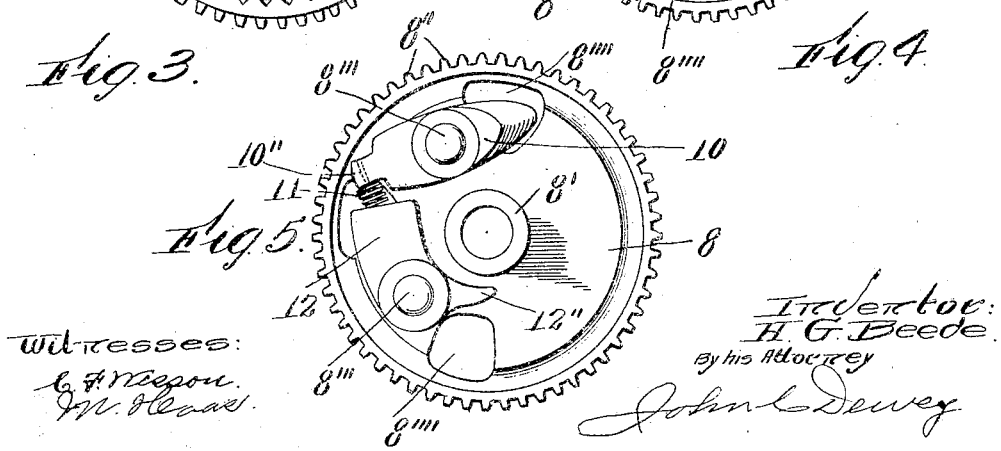

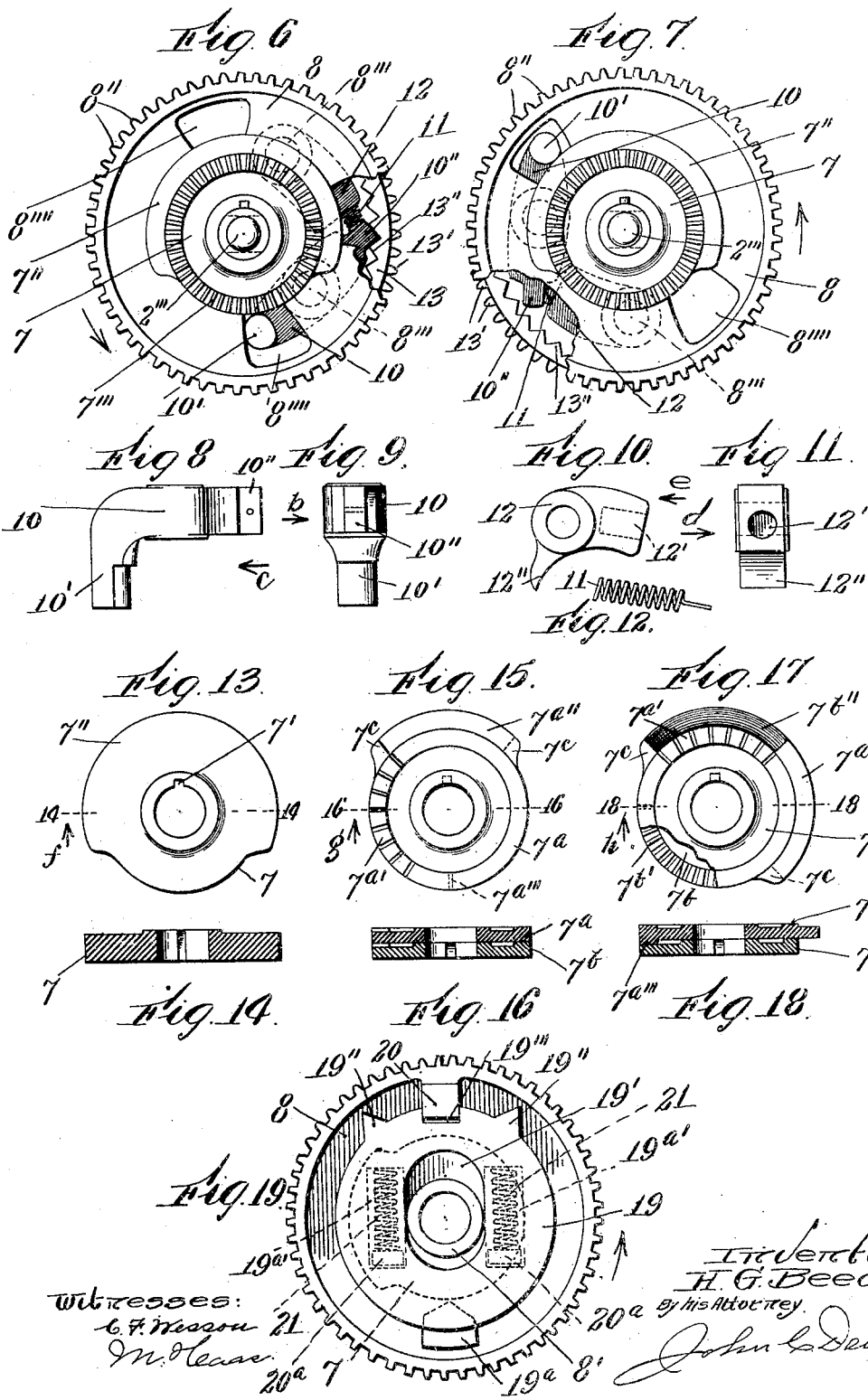

UNITED STATES PATENT OFFICE.

HERBERT G. BEEDE, OF PAWTUCKET, RHODE ISLAND.

AUTOMATIC INTERMITTENT DRIVING MECHANISM.

No. 807,996. Specification of Letters Patent. Patented Dec. 19, 1905.

Application filed November 14, 1904. Serial No. 232,551.

*To all whom it may concern:*

Be it known that I, HERBERT G. BEEDE, a citizen of the United States, residing at Pawtucket, in the county of Providence and State of Rhode Island, have invented certain new and useful Improvements in Automatic Intermittent Driving Mechanism, of which the following is a specification.

My invention relates to improvements in automatic intermittent driving mechanism; and the object of my invention is to provide an improved automatic intermittent driving mechanism of simple construction and operation by means of which an intermittent movement is communicated to a gear or pulley from a continuous running gear or pulley through a cam which operates a pawl mechanism to cause the same to engage and operate the intermittent-running gear or be disengaged therefrom to leave it at rest. The shape of the cam regulates the amount of rotation and the amount of rest of the intermittent gear.

My invention consists in certain novel features of construction of my improvements, as will be hereinafter fully described.

Figure 20:
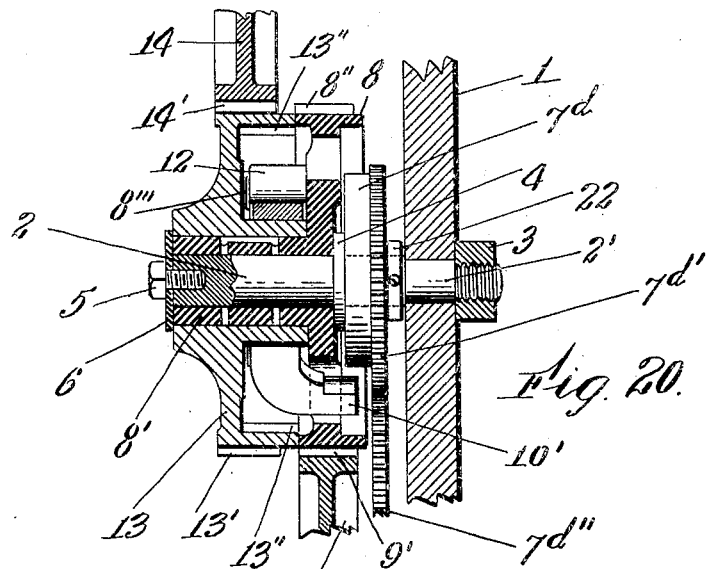
Figure 21:
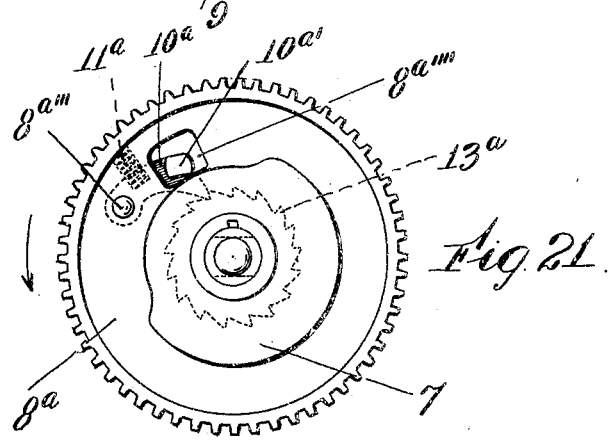
Figure 22:
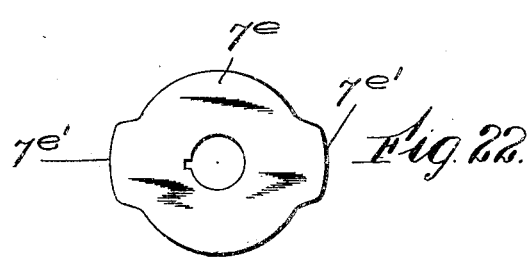

Referring to the drawings, Figure 1 is a side view of an intermittent-gear driving mechanism embodying my improvements. Fig. 2 is a central vertical section through the parts shown in Fig. 1. Fig. 3 is an inside view of the intermittent driving-gear, showing the internal teeth thereon. Fig. 4 is an inside view of the continuous driving-gear and the pawl mechanism thereon. Fig. 5 corresponds to Fig. 4, but shows the reverse position of the pawl mechanism. Fig. 6 is a section on line 6 6, Fig. 1, looking in the direction of arrow $a$, same figure. Fig. 7 corresponds to Fig. 6, but shows a different position of the pawl mechanism. Fig. 8 is a side view of the pawl detached looking in the direction of arrow $b$, Fig. 9. Fig. 9 is an end view of the pawl shown in Fig. 8 looking in the direction of arrow $c$, same figure. Fig. 10 is a side view of the spring-holder detached which carries the spring which actuates the pawl looking in the direction of arrow $d$, Fig. 11. Fig. 11 is an end view of the spring-holder shown in Fig. 10 looking in the direction of arrow $e$, same figure. Fig. 12 is a view of the actuating-spring detached. Fig. 13 is a side view of the pawl-operating cam detached. Fig. 14 is a section on line 14 14, Fig. 13, looking in the direction of arrow $f$, same figure. Fig. 15 is a side view of the pawl-operating cam made in two parts, one adjustable on the other and shown in their closed position. Fig. 16 is a section on line 16 16, Fig. 15, looking in the direction of arrow $g$, same figure. Fig. 17 corresponds to Fig. 15, but shows the two parts of the cam in their extended position. Fig. 18 is a section on line 18 18, Fig. 17, looking in the direction of arrow $h$, same figure. Fig. 19 shows a modified construction of the pawl mechanism shown in Figs. 4 and 5. Fig. 20 corresponds to Fig. 2, but shows a modified construction of the pawl-operating cam. Fig. 21 corresponds to Fig. 6, but shows a modified construction of the pawl-operating mechanism; and Fig. 22 shows a modified construction of the cam shown in Fig. 13.

I will first describe the construction of my improvements shown in Figs. 1 to 14, inclusive. In the accompanying drawings, 1 is a detached portion of a stand or frame, to which is secured a stud 2. The stud 2 has in this instance a flattened portion 2' with a shoulder 2'' engaging the frame 1. A nut 3 on the threaded end 2''' of the stud 2 binds the stud 2 in the frame 1. The stud 2 has an annular flange 4 thereon, and a pin 4', in this instance extending out therefrom. The outer end of the stud 2 has a screw-threaded hole therein, into which extends a bolt 5 to hold a collar or washer 6 on the end of the stud. Mounted on the stud 2 is a cam 7, having a cam-surface on its periphery and shown in Fig. 2 as a stationary cam, being held by a pin 4' extending into the notch 7' in the hub of the cam 7. (See Fig. 13.) The cam 7 bears against the annular flange 4. (See Fig. 2.) The cam 7 may be made as a single cam 7 (shown in Fig. 13) with one cam-surface 7'' thereon. Loosely mounted on the stud 2 is the hub 8' of the continuous running-gear 8, which has external teeth 8'' on its periphery—in this instance in mesh with the teeth 9' on a driving-gear 9. The hub 8' of the gear 8 is held between the flange 4 on the stud 2 and the collar 6 on the bolt 5 (see Fig. 2) to prevent longitudinal motion of said hub. One side of the gear 8 receives the cam 7, which may extend therein, as shown in Fig. 2. The other side of the gear 8 has preferably two studs 8''' thereon and two openings 8'''' therethrough. (See Fig. 6.) On one stud 8''' is pivotally mounted a pawl 10, one end 10' of which is curved (see Figs. 2 and 8) to extend through one of the openings 8'''' in the gear 8 and extend on the other side thereof and into the path of the peripheral cam-surface 7" on the cam 7. (See Fig. 9.) The other end of the pawl 10 on the opposite side of the gear 8 from the end 10' has the engaging projection 10" thereon and has one end of a spiral spring 11 attached thereto. The other end of the spiral spring 11 extends into a socket 12' in the spring-holder 12, the hub of which is pivotally mounted on the other stud 8'''. (See Figs. 4 and 5.) The spring-holder 12 has a projection 12" thereon to engage the hub of the gear 8 and limit the pivotal movement of said spring-holder. When the pawl mechanism is in the position shown in Fig. 4, it will operate to drive the intermittent running-gear in one direction; but the pawl 10 and spring-holder 12 may be detached from their pivotal studs 8''' (shown in Fig. 4) and their position reversed or changed, as shown in Fig. 5. In this position the pawl will act to drive the intermittent running-gear in the opposite direction. The intermittent running-gear 13 is loosely mounted on the hub 8' of the gear 8 and has teeth 13' on its periphery. (See Figs. 2 and 3.) The hub of the gear 13 is prevented from having longitudinal motion on the hub 8' by means of the washer 6. One side of the intermittent running-gear 13 is cored out to receive the pawl mechanism mounted on the continuous driven gear 8, above described, and has internal teeth 13" thereon, which are adapted to be engaged by the engaging end 10" of the pawl 10 when the inner end 10' of the pawl 10 is not traveling on the cam portion 7" on the cam 7. The spring 11 acts to hold the engaging end 10" in engagement with the internal teeth 13" on the gear 13 to turn the same through the revolution of the gear 8, carrying the pawl 10, as shown in Fig. 6. When the curved end 10' of the pawl 10 is traveling on the cam portion 7" of the cam 7, as shown in Fig. 7, then the engaging end 10" of the pawl 10 is positively held out of engagement with the internal teeth 13" on the gear 13 and said gear 13 remains at rest until the end 10' has passed off of the cam portion 7". The intermittent rotation of the gear 13 is communicated in this instance to a gear 14, the teeth of which, 14', are in mesh with the teeth 13' on the gear 13.

In Figs. 15 and 17 I have shown a modified construction of the cam shown in Fig. 13. In said Figs. 15 and 17 the cam is made in two parts, one rotatably adjustable upon the other. One part $7^b$ of the cam 7 has in this instance a cam portion $7^{b'''}$ on its periphery and a series of serrations or teeth $7^{b'}$ on its inner side or face contiguous to the inner side or face of the part $7^a$. The number of serrations or teeth $7^{b'}$ corresponds to the number of internal teeth 13" on the gear 13—in this instance forty-eight. The other part $7^a$ of the cam 7 has a cam portion $7^{a'''}$ on its periphery which is concentric or in the same arc of a circle with the cam portion $7^{b'''}$ on the part $7^b$ and has in this instance a single tooth or projection $7^{a''''}$ on its inner side or face, (shown by broken lines, Fig. 15,) which is adapted to extend between any two of the teeth $7^{b'}$ on the part $7^b$ after the two parts $7^a$ and $7^b$ of the cam 7 have been adjusted as desired. The peripheries of both cam portions $7^{a'''}$ and $7^{b'''}$ are in the same arc of a circle and have the same radius from an axis common to both. The part $7^a$ of the cam 7 has an index on its outer face consisting in this instance of lines or projections $7^{a'}$, eight in number. The distance between said lines $7^{a'}$ is in this instance twice the distance between the teeth $7^{b'}$. The number of the teeth $7^{b'}$—forty-eight—is a multiple of the teeth $7^{a'}$—that is, six to one. There is a notch in the hub portion of only one of the two parts of the adjustable cam—in this instance on the part $7^b$, as shown in the drawings—to receive the pin 4' on the flange 4 and hold said part stationary, but leaving the other part free for rotary motion for adjusting the length of the cam portions on the two parts, and after they have been adjusted the two parts of the cam are secured together in any suitable manner, preferably by a nut (not shown) turning on the stud 2. In Fig. 15 the two parts of the cam $7^a$ and $7^b$ are adjusted one upon the other to make the combined cam-surface of each cam of the shortest length, while in Fig. 17 the two parts $7^a$ and $7^b$ of the cam are adjusted to make the combined cam-surface of the greatest length. When the cam-surface is of the shortest length, (shown in Fig. 15,) a projection on each cam-surface engages the end of the other cam-surface, as shown at $7^c$. By means of a cam made in two parts, one adjustable upon the other, I may vary the length of the concentric cam-surface as desired to regulate the amount of rotation of the intermittent gear 13 without substituting a different cam. By means of the index-lines $7^{a'}$ on the part $7^a$ of the cam 7 I can regulate the length of the cam portions $7^{b'''}$ and $7^{a'''}$, which hold the pawl 10 out of engagement with the teeth 13" on the gear 13, according to the length of time which it is desired to have said gear stationary or according to the number of partial rotations which it is desired to give to said gear.

I have shown in Fig. 19 a modified construction of the pawl mechanism. Instead of having a pivoted pawl I provide a reciprocating moving pawl. The pawl 19 has a longitudinal opening 19' therethrough, through which the hub 8' of the gear 8 extends. On said pawl 19 are two engaging projections 19", adapted to engage the internal teeth 13" of the intermittent running-gear 13. The pawl 19 has an opening or recess 19''' in one end, into which extends a guide projection 20 on the gear 8. (See Fig. 19.) On the pawl 19 is a projection $19^a$, which is adapted to extend into the path of and be engaged by the cam 7 as the gear 8, carrying the pawl 19, revolves. Within recesses $19^{a'}$ in the inner side of the pawl 19 extend spiral springs 21, which bear at one end against projections 20ª on the gear 8 and at their other end against the end of the recesses 19ª'. The springs 21 act to move the pawl 19 to cause the teeth 19″ thereon to engage the internal teeth 13″ on the gear 13 and cause the gear 13 to have a rotary motion with the gear 8 and the pawl 19 thereon in either direction, according to the direction of rotation of the gear 8. In the continued rotation of the gear 8 and pawl 19 the projection 19ª on the pawl 19 will engage the cam projection 7″ on the cam 7 and cause the pawl 19 to be moved and the teeth 19″ thereon to be disengaged from the internal teeth 13″ on the gear 13, leaving said gear at rest.

In Fig. 20 is shown a modified construction of the cam 7 shown in Fig. 2. In said Fig. 20 the cam $7^d$ is loose on the stud 2 and adapted to rotate thereon and is prevented from having longitudinal motion on said stud by the annular flange 4 and the collar 22. The cam $7^d$ has a gear $7^{d'}$ formed thereon or attached thereto, the teeth of which are engaged by a driving-gear, a portion $7^{d''}$ of which is shown in Fig. 20. Through the driving-gear $7^{d''}$ and the gear $7^{d'}$ on the cam $7^d$ rotary motion at any speed desired is communicated to the cam $7^d$ to cause it to rotate on the stud 2. The speed of rotation of the cam $7^d$ should be different from the speed of rotation of the gear 8 carrying the pawl mechanism. The rotary movement of the gear 13 will be reduced by the rotating of the cam $7^d$ and regulated as desired by varying the speed of the cam.

In Fig. 21 is shown a modified construction of the intermittent driven gear 13 and the pawl-actuating mechanism. In said Fig. 21 the gear (not shown) has teeth $13^a$ on its hub to be engaged by the actuating-pawl instead of internal teeth 13″, as shown in Fig. 6. The teeth $13^a$ are engaged by a pawl $10^a$, pivoted on a stud $8^{a'''}$ on the gear $8^a$ and having a projection $10^{a'}$ extending through an opening $8^{a''''}$ in the gear $8^a$ and into the path of the cam 7. A spring $11^a$ acts to move the pawl $10^a$ into engagement with the teeth $13^a$. The operation of the gear 13 with the teeth $13^a$ on its hub and of the pawl $10^a$ to rotate said gear will be the same as above described in connection with the gear 13 having teeth 13″ thereon.

In Fig. 22 is shown a modified construction of the cam 7 shown in Fig. 13. In said Fig. 22 the cam $7^e$ has two cam-surfaces $7^{e'}$ thereon. It will be understood that there may be one or more cam-surfaces on the operating-cam.

From the above description, in connection with the drawings, the operation of my improvements in automatic intermittent driving mechanism will be readily understood by those skilled in the art.

I have shown and described my improvements used in connection with gear-driving mechanism; but it will be understood that they may also be used in connection with pulley-driving mechanism, and the details of construction of my improvements may be varied, if desired.

Having thus described my invention, what I claim as new, and desire to secure by Letters Patent, is—

1. In an automatic intermittent driving mechanism, the combination with a continuous running gear or pulley, and an intermittent running gear or pulley, of intermediate mechanism for communicating, from the continuous running gear or pulley, an intermittent rotary motion to the intermittent running gear or pulley, said mechanism comprising a pawl pivotally mounted on a stud, secured on one side of the continuous running gear or pulley and extending in a plane parallel to the axis of said pulley, and said pawl adapted to engage the intermittent running gear or pulley at one side of said continuous-running gear or pulley, and also adapted to engage a peripheral cam on the opposite side of said continuous running gear or pulley, and said peripheral cam, adapted to move said pawl in one direction, and means for moving the pawl in the other direction.

2. In an automatic intermittent driving mechanism, a continuous running gear or pulley having on one side or face thereof an actuating-pawl, and said pawl having its actuating portion on the side of said gear on which it is supported, and having a projection thereon extending through to the opposite side of said gear or pulley, to extend into the path of a cam, and said cam for operating said pawl, substantially as shown and described.

3. In an automatic intermittent driving mechanism, a continuous running gear or pulley having on one side or face thereof two studs, a pawl pivotally mounted on one stud, and a spring-holder pivotally mounted on the other stud, said pawl and holder being interchangeable on said studs, and said pawl having its engaging and actuating end or portion on one side of said gear or pulley, and a projection thereon extending through to the other side of said gear or pulley, and into the path of a cam, and said cam positively moving the pawl in one direction, substantially as shown and described.

4. In an automatic intermittent driving mechanism comprising therein a pawl mechanism, a cam for positively moving the pawl in one direction, said cam made in two parts rotatably adjustable on each other, and each part having a peripheral cam portion thereon, the peripheries of both cam portions being in the same arc of a circle, and having the same radius from an axis common to both.

5. In an automatic intermittent driving mechanism, the combination with a continuous running gear or pulley, and an intermittent running gear or pulley, of intermediate connections for communicating from the continuous running gear or pulley an intermittent rotary motion to the intermittent running gear or pulley, said mechanism comprising a pawl carried on the continuous running gear or pulley, and a cam as 7$^d$ adapted to engage and positively move said pawl in one direction, and adapted to have a rotary motion, independent of the rotary motion of said continuous running gear or pulley, and means for rotating said cam, substantially as shown and described.

HERBERT G. BEEDE.

Witnesses:
JOHN C. DEWEY,
M. HAAS.